July 30, 1963  H. J. McCAULEY, JR  3,099,184

SHEET METAL SCREW

Filed Feb. 27, 1961

INVENTOR.
Herbert J. McCauley, Jr.,
BY
Christel Bean.
ATTORNEYS.

3,099,184
SHEET METAL SCREW
Herbert J. McCauley, Jr., 731 W. Ferry St.,
Buffalo, N.Y.
Filed Feb. 27, 1961, Ser. No. 92,041
2 Claims. (Cl. 85—1)

This invention relates to screws and particularly to screws formed entirely from sheet metal and to a method of manufacturing the same.

In the fastener art the term "sheet metal screw" usually refers to a screw particularly adapted to engage in a perforation in a metal sheet, generally by reason of the shape and the pitch of the threads thereof. Screws constructed or manufactured according to the principles of the present invention are well suited for use as such "sheet metal screws" but are characterized particularly by the fact that they are fabricated from sheet metal.

In a preferred form the screws of the present invention are made entirely from a single sheet metal blank which may be formed into a finished screw without any fabricating or manufacturing operations or processes other than more or less conventional sheet metal die forming operations.

Speaking generally, the screws of the present invention are formed from a single blank wherein the central portion forms the head of the screw and radiating leg portions of the blank combine to form the shank. These radiating leg portions of the blank are substantially wider than the surface portions of the shanks which they form and their marginal portions are flanged so that they extend radially inwardly in the shank of a finished screw to reinforce the shank in a manner which will appear more clearly from a consideration of the form of screw and method of manufacture thereof set forth herein in some detail by way of illustrating the principles of the present invention.

Furthermore, the manner in which the radiating shank-forming legs are formed of substantial width and then flanged inwardly at their edges, so that only their central portions form the actual shank periphery, provides a structure wherein the central portions of such radiating legs may be lanced or otherwise pierced or formed by sheet metal die operations to form ridges or short flange formations which in the finished screw provide thread formations at the periphery of the shank. Threads may thus be formed in the process of manufacturing the screws entirely by die stamping operation and without any lathe or screw machine operations and without the usual threading-die operations.

In one form of the screws of the present invention a further advantage is attained by providing in the several radiating legs which subsequently cooperate to form several arcuate portions of the periphery of a finished screw shank, thread formations which are staggered with respect to the thread formations of another leg so that in the finished screw normally adjacent thread formations are located so that one is disposed along the surface of one leg portion of the shank, the next thread is disposed along another leg of the blank, and so on, as will appear more clearly later herein.

A single detailed embodiment of the new article of the present invention and the novel manufacturing method employed in producing the same is illustrated in the accompanying drawing and described in detail in the following specification. However, it is to be understood numerous mechanical variations may be indulged in without departing from the principles of the invention. Also, the various novel features of the invention may be variously combined and employed in various forms of the screw construction principles of the invention. The scope of the present invention is not limited by the exemplary embodiment which is disclosed for purposes of illustration nor otherwise than as defined in the appended claims.

Figure 1:
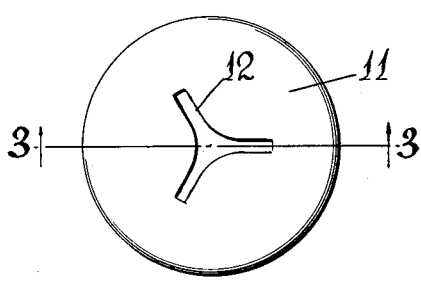
FIG. 1 is an end view of one form of the screw of the present invention viewed from the head end thereof.
Figure 3:
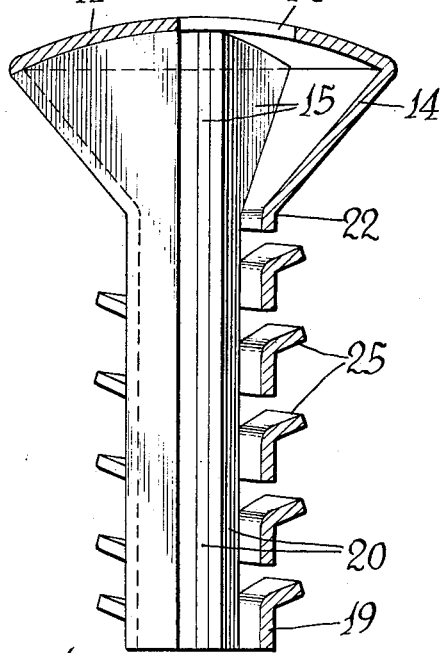
Figure 2:
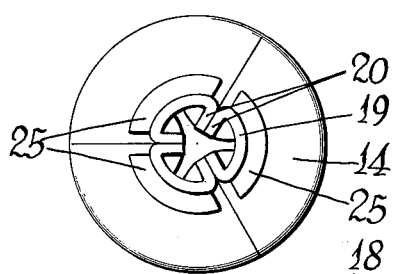
FIG. 2 is an end view of the screw of FIG. 1 viewed from the opposite or point end thereof.
Figure 4:
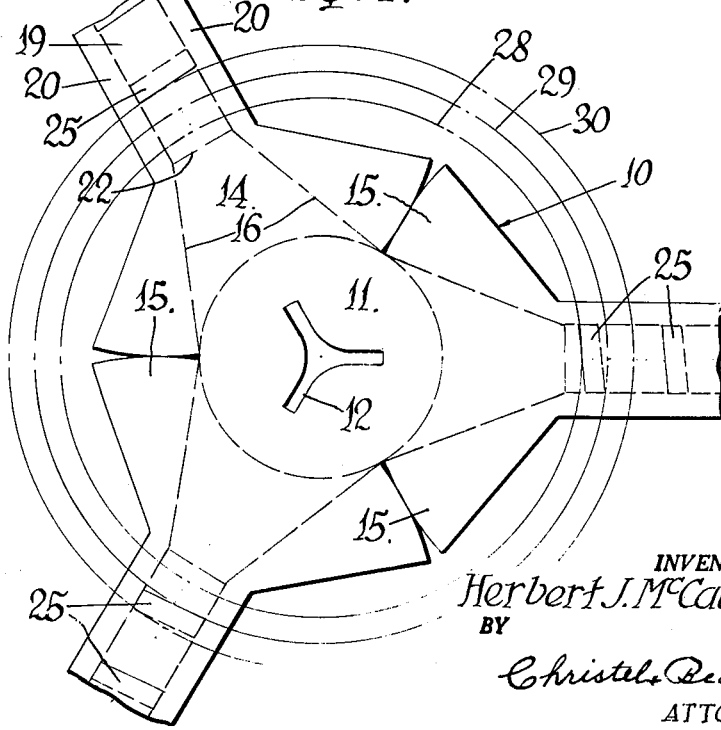

FIG. 3 is a longitudinal cross sectional view of the screw of FIGS. 1 and 2 taken on the line 3—3 of FIG. 1; and FIG. 4 is a fragmentary illustration of a sheet metal blank employed in forming the screw of FIGS. 1 through 3.

Like characters of reference denote like parts throughout the several figures of the drawing. The specific form of screw head illustrated herein by way of example is the type known in the art as an oval countersunk head although various types of head forms may be produced within the teachings of the invention. Furthermore, the end of the shank may be tapered or pointed in various ways as desired, as by pointing the outer ends of the legs of the blank and forming the same into a conical or frusto-conical end point formation.

It is believed that the construction of the screw of FIGS. 1, 2 and 3 will be best understood from a preliminary description of the blank from which the same is formed and the manner in which the various parts of the blank cooperate to form the finished screw. Various stamping die arrangements may be employed in bending and drawing the portions of the blank into the finished screw but the general succession of forming steps will be apparent to those skilled in the metal stamping art.

In FIG. 4 the sheet metal blank is designated generally by the numeral 10 and dash lines thereon indicate the general location of the various bend or form lines. As shown in FIG. 4, a central circular area of the blank designated 11 forms the top surface of the head of the screw in the form illustrated herein and the same may be dished to form the rounded top of the head at any convenient time in the forming process. Where convenient the numerals applied to designated portions of the blank 10 likewise identify the corresponding parts of the finished screw.

The top surface 11 of the screw head may be perforated or slotted in various ways to receive conventional or Phillips screw drivers, or such top surface may have a screw driver socket of any desired configuration formed therein by drawing the metal downwardly to form the same. In the present instance, by way of example, a triangular slot arrangement designated 12 is provided to receive a screw driver bit of corresponding shape. This form is shown herein because it is well suited to the three part shank of the present embodiment, although slots or openings of other forms may be provided by proper notching of the head portion, even in this three part shank arrangement.

The frusto-conical under side of the head of the screw of the present embodiment is formed in three arcuate segments by three tapering areas 14 which radiate from the circular area 11 as shown in FIG. 4. Tapering flange portions 15 lie at each side of each of the tapering areas 14, being in abutment therewith along bend lines 16.

The portions of blank 10 which form the shank of the screw comprise outwardly radiating continuations of the tapering areas 14. These radiating continuations or legs are designated 18 and each comprises a central area or band 19 which ultimately forms an arcuate portion of the surface of the shank of the screw and marginal portions 20 which serve several new and useful purposes, as will presently appear.

The manner in which the foregoing blank is bent up to form the body portion of a screw exclusive of the threads will now be described. Various successions of bending and forming steps may be employed within the province of those skilled in the metal stamping art. The flange portions 15 and the marginal portions 20 of shank forming continuations or legs 18 are jointly bent or flanged up to form the roughly triangular cross section of each shank component as shown in the end view, FIG. 2.

In the three section shank illustrated herein by way of example the pairs of flange portions 15 and marginal portions 20 are bent to form an included angle of 120 degrees and therefore the three sections abut as clearly shown in FIG. 2 to form cylindrical shanks and the frusto-conical under side of a countersunk screw head. These flange and marginal portions are brought together to the positions shown in FIG. 2 in the process of bending the blank along the dash line circle which outlines the top surface 11 and forming the bend indicated at 22 which forms the juncture between the screw head and the shank.

It will be noted that, in the preferred form illustrated herein, the proximate edges of the flange portions 15 are arcuate so that, as shown in FIG. 3, these edges directly underlie the top surface 11 of the blank and thus support and reinforce the same. Thus the interior of the screw, both as to the head and the shank, is thoroughly reinforced and braced. The flanges 15 and 20 provide internal bracing which renders the finished screw as rigid to all practical intents and purposes as a conventional solid metal screw body.

The thread formations along the peripheral portions of the shank of the screw may assume various forms and may be fabricated in various ways. In any event the manner in which the shank portions of the screw are formed and arranged permits the employment of thread formations which extend only across the medial portions of the shank-forming legs 18 of the blank, whereby the marginal portions 20 remain intact and provide adequate structural strength even though the thread formations pierce the blank across the medial portions 19 of the shank-forming legs 18.

Thus the flanges formed from the marginal portions 20 provide manifold advantages. These flanges stiffen the individual legs which form the shank; by their abutment as shown in FIG. 2 they form a virtually solid composite shank; they form locating surfaces which are pressed into abutment to form the composite cylindrical shank of the screw body; and they permit the provision of thread formations of any desired type or configuration entirely across the medial portions 19 of the leg formations which combine to form the exposed exterior portion of the shank without unduly weakening the shank-forming legs of the structure.

In the present instance the thread formations are struck directly from the sheet metal of the medial bands 19 of the radiating leg portions 18 of the blank 10. Since the thread formations stop substantially short of the side edges of the portions 18 they may be thus struck therefrom without impairing the strength of the structure. As illustrated particularly in FIG. 3 the thread formations take the form of oblique flanges 25, the outer edges or corners of which serve very efficiently as threads, particularly of the type adapted to engage the margins of perforations in sheet metal in cases where the screws of the present invention are to be engaged with sheet metal in this well known manner. The threads 25 may take other forms and be otherwise disposed and proportioned in instances where they are to serve other purposes.

A further aspect of novelty of the screws of the present invention resides in the fact that the thread formations along the several extending shank-forming leg portions 18 may be staggered in such a way that the individual threads of each portion 18 are spaced a multiple of the actual thread pitch, whereby the strength of the individual shank structures may be enhanced where desired and the thread formations may be formed with simpler dies and with less stamping work.

In FIG. 4 the three dot and dash circles 28, 29 and 30 indicate the pitch of the thread which it is desired to employ and which establishes the helix angle along which the individual thread formations 25 will lie. However, it will be noted that the outer edges of a thread 25 intersects the inner cidcle 28 at the right hand leg portion 18, whereas the outer edges of a thread 25 intersect the next circle 29 on the lower left hand leg portion 18 and the outer edges of a thread 25 intersect the third circle 30 on the upper left hand leg portion 18.

This pattern is continued throughout the length of the screw so that in the specific instance shown and described by way of example only every third thread appears along any given shank sector 18.

It is to be understood that this thread arrangement is not necessarily employed with the general screw body formation previously described but represents an addition thereto which cooperates in the general structure to produce a further new combination which extends the use and capabilities of the screw of the present invention and thus presents a further and additional novel combination of elements which is especially useful in certain screw applications and in certain sizes and proportions, particularly when relatively close pitched threads are desired or when particular strength requirements are present.

The outer ends of the radiating legs 18 may be tapered or pointed in blank form to facilitate forming a tapering or rounded point at the end of the shank and such point end of the shank may be swaged or otherwise fabricated for this purpose. If desired, such point portion may be welded or otherwise treated, although such extraneous fabrication is not ordinarily required.

I claim:

1. A screw formed from sheet metal and having a head portion and a shank portion, said shank portion comprising a plurality of adjacent members of sectoral cross section each having an arcuate portion forming a portion of the periphery of said shank portion and marginal flanges integral with said arcuate portions and extending substantially the full length of the same, said flanges radiating inwardly toward the axis of said shank portion a distance sufficient to reinforce said arcuate portions and provide a broad abutment area, said flanges abutting corresponding marginal flanges on adjacent sectoral members to insure concentricity of said adjacent members, said shank portion further comprising a portion integral with and joining the outer circumference of said head portion and said sectoral members to form a hollow head and whereby said sectoral members comprise integral extensions of said head portion, each of said arcuate portions having transverse thread formations comprising elongated oblique flanges struck therefrom, said marginal flanges having enlarged portions adjacent to said head portion conforming generally to the interior configuration of said hollow head to fit therein and internally reinforce the same.

2. A screw according to claim 1 wherein the thread formations of each of said arcuate surfaces are spaced at a multiple of the desired thread pitch and staggered with respect to the threads of the other surfaces with the thread formations of the several arcuate surfaces lying along a common helix.

References Cited in the file of this patent

UNITED STATES PATENTS 2,267,873    Place    Dec. 30, 1941
2,549,393    Siesel    Apr. 17, 1951

FOREIGN PATENTS 844,909    Great Britain    Aug. 17, 1960